United States Patent [19]

Sweeten

[11] Patent Number: 5,722,376
[45] Date of Patent: Mar. 3, 1998

[54] APPARATUS AND METHOD FOR CONTROLLING THE FLOW OF CRANKCASE EMISSIONS IN AN INTERNAL COMBUSTION ENGINE

[75] Inventor: Theodore P. Sweeten, Applegate, Oreg.

[73] Assignee: Ventures Unlimited Inc., Applegate, Oreg.

[21] Appl. No.: 772,179

[22] Filed: Dec. 20, 1996

[51] Int. Cl.$^6$ ................................................ F02M 25/06
[52] U.S. Cl. .................................................... 123/574
[58] Field of Search ................................ 123/572, 573, 123/574, 41.86

[56] References Cited

U.S. PATENT DOCUMENTS

| | | | |
|---|---|---|---|
| 3,673,994 | 7/1972 | Aono | 123/119 B |
| 3,754,538 | 8/1973 | Ephraim | 123/41.86 |
| 4,167,164 | 9/1979 | Bachmann | 123/574 |
| 4,257,383 | 3/1981 | Boswell | 123/574 |
| 5,113,836 | 5/1992 | Sweeten | 123/574 |
| 5,228,424 | 7/1993 | Collins | 123/574 |

*Primary Examiner*—Marguerite McMahon
*Attorney, Agent, or Firm*—Meschkow & Gresham, P.L.C.; Jordan M. Meschkow; Lowell W. Gresham

[57] ABSTRACT

An apparatus is provided for controlling the flow of crankcase emissions. The apparatus includes a crankcase emissions regulator for regulating the flow of crankcase emissions discharged from an engine crankcase, a pressure sensor for sensing a crankcase pressure, and an electronic control module (ECM) for controlling the emissions regulator. The ECM adjusts the emissions regulator in response to the pressure differential between the detected crankcase pressure and a predetermined pressure value programmed in the ECM.

15 Claims, 3 Drawing Sheets

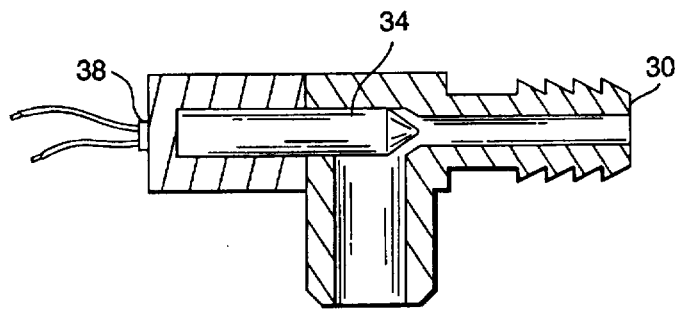
Fig. 4
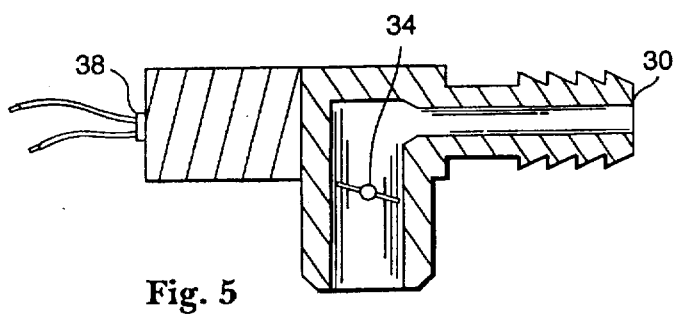
Fig. 5
Fig. 6
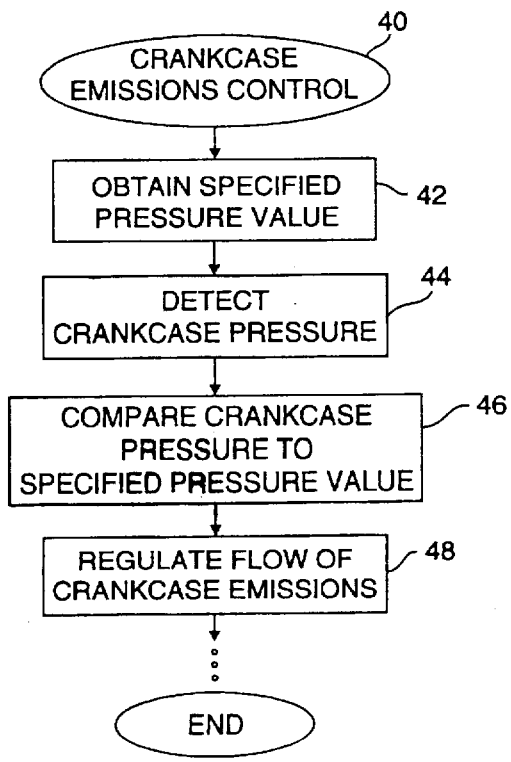

APPARATUS AND METHOD FOR CONTROLLING THE FLOW OF CRANKCASE EMISSIONS IN AN INTERNAL COMBUSTION ENGINE

BACKGROUND OF THE INVENTION

1. Field of the Invention

The present invention relates generally to controlling crankcase emissions from internal combustion engines, and more particularly to devices for regulating the flow of crankcase emissions.

2. The Prior Art

An internal combustion engine produces harmful pollutants within its crankcase during operation. These pollutants may be produced by blow-by gases (combustion waste gases that leak past the piston rings into the crankcase) and the rotating action of the crankshaft turning in the crankcase. In the past these harmful emissions were vented into the air via a road draft tube, or through a positive crankcase ventilation (PCV) valve into the combustion chamber of the engine. Typical PCV valves react to the change in pressure within a crankcase to allow waste gases to be routed back to the intake manifold of the engine for recombustion.

Many prior art PCV valves operate mechanically via a spring biased valve that opens or closes in response to changes in crankcase pressure. Such PCV valves open only after a certain threshold pressure has developed within the crankcase. For this reason, prior art PCV valves of this type do not react immediately to the changing pressure within the crankcase of an engine subject to typical driving conditions. In addition, most standard PCV valves have only two operational states, i.e., open or closed. Although such valves may be suitable for many purposes, they may not accurately or consistently regulate the crankcase pressure or the flow of emitted crankcase gases. Therefore, a need exists for a device that can effectively regulate the emission of crankcase gases while overcoming the problems mentioned above.

Individual engines may have unique operating characteristics that affect the amount of internal crankcase pressure and the crankcase emissions flow rate required for efficient operation. For example, an engine may be designed such that a slightly positive or a slightly negative crankcase pressure is desirable during normal driving conditions. As another example, the size of an engine is related to the flow rate of crankcase emissions discharged from the engine. Unfortunately, prior art PCV valves may not be able to adequately maintain a specific operating pressure within a crankcase. In addition, known PCV valves cannot be variably biased to maintain a vehicle-specific crankcase pressure during normal operating conditions. Furthermore, existing crankcase emissions regulators may not be adjustable for use with different sized engines. Thus, it would be desirable to have an apparatus that can address the above deficiencies in the prior art.

SUMMARY OF THE INVENTION

Accordingly, it is an advantage of the present invention that an apparatus is provided that effectively regulates the flow of crankcase emissions from an internal combustion engine.

Another advantage of the present invention is that an apparatus is provided that continuously reacts to the changing pressure within a crankcase by adjusting the flow of crankcase emissions.

A further advantage is that an apparatus for regulating the flow of crankcase emissions is provided that includes a continuously variable valve assembly.

Another advantage of the present invention is that an apparatus is provided that can be programmed with a biasing pressure according to specific engine applications.

The above and other advantages of the present invention are carried out in one form by an apparatus for controlling the flow of crankcase emissions from an internal combustion engine. The apparatus includes: a crankcase emissions regulator having a housing, an inlet for receiving the crankcase emissions, an outlet for discharging the crankcase emissions, and an electronic valve for regulating the discharge of the crankcase emissions; means for sensing the crankcase pressure; and means for controlling the valve in response to the crankcase pressure.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 is a sectional side view of a needle valve assembly configured for use with the crankcase emissions regulator;

FIG. 5 is a sectional side view of a butterfly valve assembly configured for use with the crankcase emissions regulator; and FIG. 6 is a procedure flow diagram of a crankcase emissions control procedure according to the present invention.

DETAILED DESCRIPTION OF THE PREFERRED EMBODIMENTS

Figure 1:
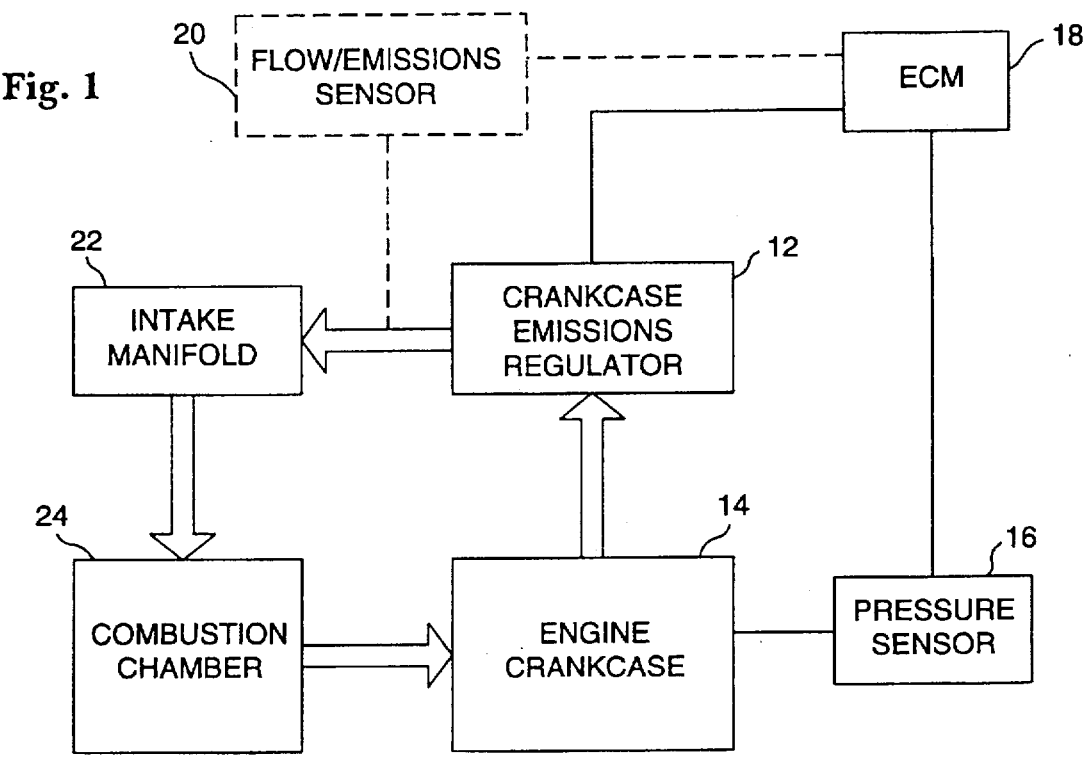
FIG. 1 is a schematic representation of an apparatus according to the present invention.

With reference to FIG. 1, an apparatus 10 according to the present invention for controlling the flow of crankcase emissions is schematically illustrated. Apparatus 10 is utilized in conjunction with an internal combustion engine (not shown). In general, apparatus 10 includes a crankcase emissions regulator 12 for regulating the flow of crankcase emissions discharged from an engine crankcase 14, a pressure sensor 16 for sensing a crankcase pressure, and an electronic control module (ECM) 18 for controlling regulator 12. An alternate embodiment (discussed below) also includes a flow/emissions sensor 20 that provides additional information to ECM 18. As depicted in FIG. 1 by the arrows, the crankcase emissions pass through regulator 12 before being routed to an intake manifold 22. Intake manifold 22 leads to a combustion chamber 24, where the crankcase emissions are recombusted.

Figure 2:
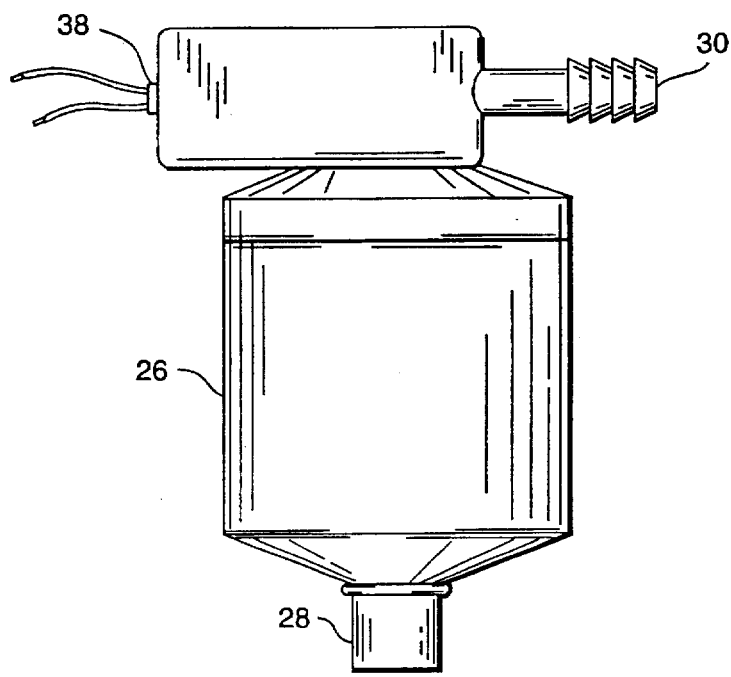
FIG. 2 is a side view of a crankcase emissions regulator according to the present invention.
Figure 3:
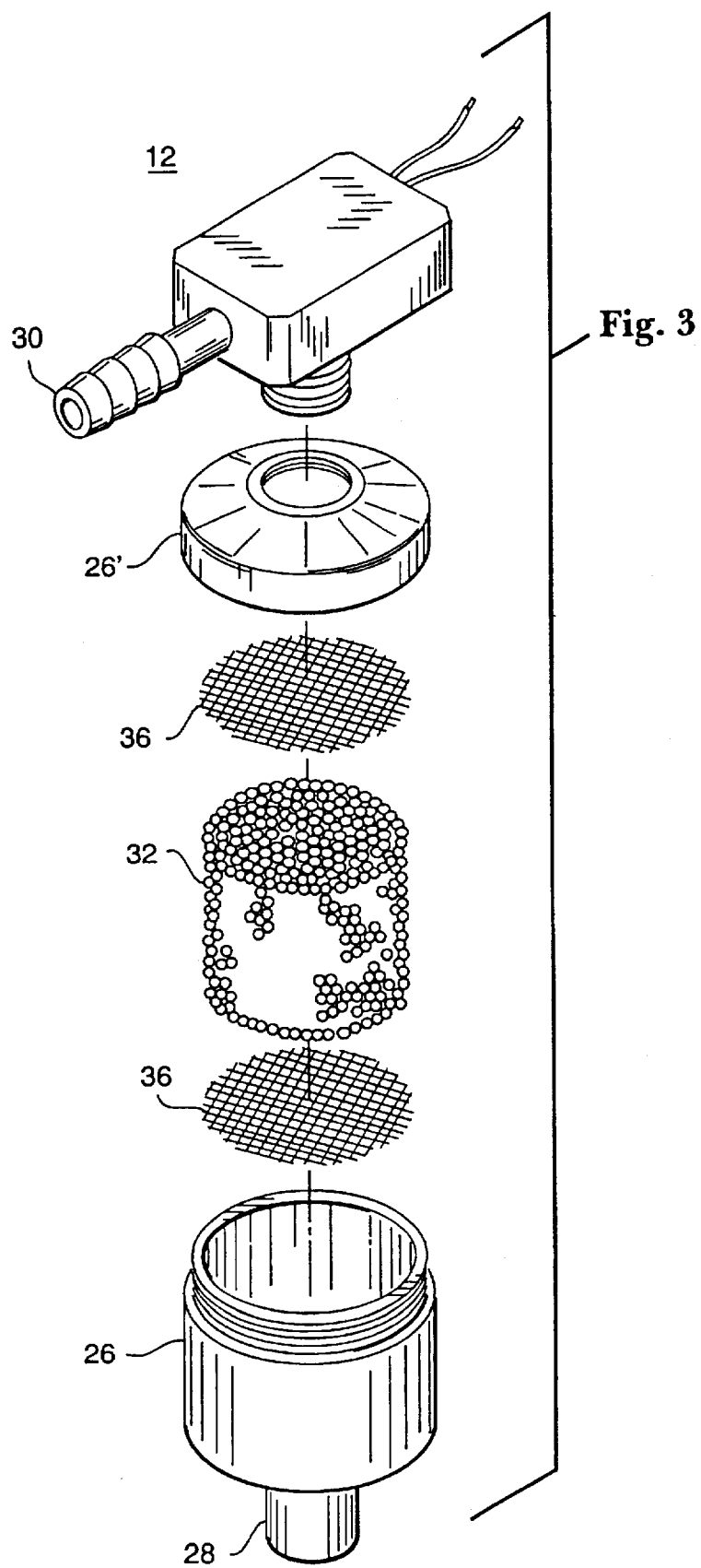
FIG. 3 is an exploded perspective view of the crankcase emissions regulator shown in FIG. 2.

Referring now to FIGS. 2–3, regulator 12 according to a preferred embodiment of the present invention is illustrated in detail. In this embodiment, regulator 12 includes a housing 26, an inlet 28 for receiving the crankcase emissions from crankcase 14, an outlet 30 for discharging the crankcase emissions from housing 26, a filtering material 32 for filtering the crankcase emissions, and a valve assembly 34 (shown in FIGS. 4–5) for regulating the flow of the crankcase emissions.

Housing 26 is preferably a two-piece assembly that contains filtering material 32. According to one aspect of the present invention, filtering material 32 is formed from a mixture of silica gel and carbon particles. Filtering material 32 may alternatively be formed from silicon beads or other suitable materials. To increase the filtering capability, filtering material 32 is preferably coated with a viscous fluid such as oil or an oil additive typically used for various automobile applications. Of course, other fluids or additives may be utilized to meet specific requirements. As shown in FIG. 3, filtering material 32 is maintained within housing 26 by a plurality of screens 36 sized to fit within housing 26. Housing 26 includes a housing cover 26' that completes the two-piece assembly.

Housing 26 includes inlet 28 and outlet 30 for the intake and discharge, respectively, of the crankcase emissions. Inlet 28 may be coupled to crankcase 14 directly or via a hose, a tube, or other suitable conduit (not shown). Outlet 30 allows the filtered and flow regulated crankcase emissions to eventually be fed into intake manifold 22 via a hose or other conduit (not shown).

With reference now to FIGS. 4–5, regulator 12 includes a valve assembly 34 for regulating the flow rate of the crankcase emissions and, consequently, the pressure within crankcase 14. Although valve assembly 34 is preferably located proximate to outlet 30, nothing prevents the present invention from having valve assembly 34 positioned in different locations within housing 26. Valve assembly 34 is preferably an electronically operated element that is continuously variable between an open state and a closed state. Electronic valves are well known to those skilled in the art, and will not be described in detail herein. The continuous nature of valve assembly 34 is desirable to provide improved control over both the flow of the crankcase emissions and the pressure within crankcase 14. Thus, apparatus 10 can monitor and adjust the crankcase emissions flow and the crankcase pressure according to the changing operating condition of the engine.

FIG. 4 depicts valve assembly 34 configured as an electronic needle valve, while FIG. 5 depicts valve assembly 34 configured as an electronic butterfly valve. Although these two configurations are preferred, other valve configurations may be suitable for valve assembly 34. The operation of both electronic needle and electronic butterfly valves are well known, therefore this description will not discuss them in detail. As such, the actual operating components and electronic elements may differ from the basic illustrations shown in FIGS. 4–5. For either configuration, valve assembly 34 includes an electronic connector 38 that is electronically connected to ECM 18 (see FIG. 1). A control signal from ECM 18 will cause either the needle valve or the butterfly valve to open or close. It should be appreciated that valve assembly 34 is electronically adjustable such that a desired flow rate or crankcase pressure is achieved.

Referring again to FIG. 1, apparatus 10 includes ECM 18, which functions to control regulator 12. ECM 18 may be integral to a larger vehicle computer (not shown), or ECM 18 may be a separate unit devoted to engine operations. ECM 18 is electronically connected to pressure sensor 16 and to regulator 12. Pressure sensor 16 may be connected directly to crankcase 14 or via a hose, a tube, or the like. Sensors for use with automotive and other applications are well known, and the specific type used will vary according to operating specifications.

ECM 18 is programmable with a predetermined pressure value (not shown) that corresponds to a "normal" operating crankcase pressure for the particular engine. For versatility, the predetermined pressure value may be adjusted so that apparatus 10 can be utilized on different engines or biased to suit specific operating requirements. For example, some engines may function more efficiently if crankcase 14 is biased with a slightly negative pressure, while other engines may require a slightly positive crankcase pressure. ECM 18 includes a comparator (not shown) to continuously (or periodically) compare the predetermined pressure value with the crankcase pressure detected by pressure sensor 16. ECM 18 then adjusts regulator 12 to "correct" the crankcase pressure. Thus, apparatus 10 functions as a control loop to maintain the proper pressure within crankcase 14.

ECM 18 may monitor or adjust other operating parameters in addition to those described above. For example, FIG. 1 shows flow/emissions sensor 20 that can be optionally installed to monitor the flow rate of the crankcase emissions and analyze the quality of the crankcase emissions. Thus, ECM 18 may also adjust regulator 12 in response to a signal received from flow/emissions sensor 20. With flow/emissions sensor 20 included, apparatus 10 can effectively monitor and adjust regulator 12 according to flow, emissions, and pressure parameters.

It should be apparent to those skilled in the art that regulator 12 need not be integral to a filter assembly, as described above. Indeed, nothing prevents the present invention from having regulator 12 stand alone as a positive crankcase ventilation (PCV) valve replacement. Of course, valve assembly 34 may be configured in various shapes and sizes to allow regulator 12 to function as a suitable PCV valve replacement.

With reference now to FIG. 6, a flow diagram illustrates a crankcase emissions control procedure 40 according to the present invention. The above description of apparatus 10 should be referred to for additional details. Although control procedure 40 is described from the perspective of ECM 18, the actual process may be carried out by the various elements of apparatus 10.

Control procedure 40 begins with a task 42. Task 42 obtains a specified pressure value that is stored at ECM 18. As described above, the pressure value is variably programmable to provide a bias pressure for the particular engine. Following task 42, a task 44 detects the crankcase pressure. Task 44 is initially carried out by pressure sensor 16, and ECM 18 receives a signal representing the crankcase pressure. Following task 44, a task 46 is performed by ECM 18.

During task 46, ECM 18 compares the detected crankcase pressure with the stored pressure value. Following task 46, a task 48 regulates the emissions flow (and crankcase pressure) by adjusting valve assembly 34 in regulator 12. Of course, other parameters may be monitored and processed by ECM 18, as described above in relation to apparatus 10. Following task 48, control procedure 40 ends.

As indicated by the ellipses after task 48, control procedure 40 may include additional steps or be part of a larger engine control process. For example, control procedure 40 may include a filtering step that separates a liquid portion of the crankcase emissions from a gaseous portion of the crankcase emissions. A filter/regulator element is described above in connection with apparatus 10. In addition, control procedure 40 may be periodically repeated to maintain effective control over the crankcase pressure and the crankcase emissions flow rate.

In summary, the present invention provides an apparatus and method for effectively regulating the flow of crankcase emissions from an internal combustion engine. The apparatus continuously reacts to the changing pressure within a crankcase by adjusting the flow of crankcase emissions. The apparatus includes an electronic valve assembly that is continuously variable between an open state and a closed state. In addition, the apparatus provided can be programmed with a biasing crankcase pressure according to specific engine applications.

The above description is of a preferred embodiment of the present invention, and the invention is not limited to the specific embodiment described and illustrated. Furthermore, many variations and modifications will be evident to those skilled in this art, and such variations and modifications are intended to be included within the spirit and scope of the invention, as expressed in the following claims.

What is claimed is:

1. An apparatus for controlling a flow of crankcase emissions from a crankcase of an internal combustion engine, said apparatus comprising:
   a crankcase emissions filter/regulator having
      a housing,
      an inlet for receiving said flow of crankcase emissions from said crankcase,
      an outlet for discharging said flow of crankcase emissions from said housing,
      a filtering material, located within said housing, for filtering said flow of crankcase emissions, and
      means for regulating said flow of crankcase emissions, said means for regulating being located within said housing;
   means for sensing a crankcase pressure; and
   means for controlling said means for regulating in response to said crankcase pressure, comprising an electronic control module (ECM) electronically connected to said means for sensing and electronically connected to said means for regulating, wherein:
      said ECM compares said crankcase pressure to a predetermined pressure value stored at said ECM; and
      said means for regulating is electronically controlled by said ECM.

2. An apparatus according to claim 1, wherein said means for regulating comprises an electronically controlled needle valve assembly.

3. An apparatus according to claim 1, wherein said means for regulating comprises an electronically controlled butterfly valve assembly.

4. An apparatus according to claim 4, wherein said predetermined pressure value is adjustable.

5. An apparatus according to claim 4, further comprising an air flow/emission sensor electronically connected to said ECM, wherein said means for regulating is further controlled by said ECM in response to a signal from said air flow/emission sensor.

6. An apparatus for controlling a flow of crankcase emissions from a crankcase of an internal combustion engine, said apparatus comprising:
   a crankcase emissions filter/regulator having
      a housing,
      an inlet for receiving said flow of crankcase emissions from said crankcase,
      an outlet for discharging said flow of crankcase emissions from said housing,
      a filtering material, located within said housing, for filtering said flow of crankcase emissions, wherein said filtering material is coated with a viscous fluid, and
      means for regulating said flow of crankcase emissions, said means for regulating being located within said housing;
   means for sensing a crankcase pressure; and
   means for controlling said means for regulating in response to said crankcase pressure.

7. An apparatus for controlling a flow of crankcase emissions from a crankcase of an internal combustion engine, said apparatus comprising:
   a crankcase emissions filter/regulator having
      a housing,
      an inlet for receiving said flow of crankcase emissions from said crankcase,
      an outlet for discharging said flow of crankcase emissions from said housing,
      a filtering material, located within said housing, for filtering said flow of crankcase emissions, and
      means for regulating said flow of crankcase emissions, said means for regulating being located within said housing and wherein said means for regulating is continuously variable between a closed state and an open state;.
   means for sensing a crankcase pressure; and
   means for controlling said means for regulating in response to said crankcase pressure.

8. An apparatus for controlling a flow of crankcase emissions from a crankcase of an internal combustion engine, said apparatus comprising:
   a crankcase emissions regulator having
      a housing,
      an inlet for receiving said crankcase emissions into said housing,
      an outlet for discharging said crankcase emissions from said housing, and
      an electronically controlled valve for regulating said flow of crankcase emissions, said valve being located within said housing and being continuously variable between a closed state and an open state;
   means for sensing a crankcase pressure; and
   means for controlling said valve in response to said crankcase pressure.

9. An apparatus according to claim 8, wherein said valve is a needle valve assembly.

10. An apparatus according to claim 8, wherein said valve is a butterfly valve assembly.

11. An apparatus for controlling a flow of crankcase emissions from a crankcase of an internal combustion engine, said apparatus comprising:
   a crankcase emissions regulator having
      a housing,
      an inlet for receiving said crankcase emissions into said housing,
      an outlet for discharging said crankcase emissions from said housing, and
      an electronically controlled valve for regulating said flow of crankcase emissions,
      said valve being located within said housing;
   means for sensing a crankcase pressure; and
   means for controlling said valve in response to said crankcase pressure wherein said means for controlling comprises an electronic control module (ECM) electronically connected to said means for sensing and to said valve, wherein:
      said ECM includes a means for comparing said crankcase pressure to a predetermined pressure value stored at said ECM; and
      said valve is electronically controlled by said ECM.

12. An apparatus according to claim 11, wherein said predetermined pressure value is adjustable.

13. An apparatus according to claim 11, further comprising an air flow/emission sensor electronically connected to said ECM, wherein said valve is further controlled by said ECM in response to a signal from said air flow/emission sensor.

14. An apparatus for controlling a flow of crankcase emissions from a crankcase of an internal combustion engine, said apparatus comprising:

a housing;

an inlet for receiving said crankcase emissions into said housing;

an outlet for discharging said crankcase emissions from said housing; and an electronically controlled valve for regulating said flow of crankcase emissions, said valve being located within said housing; wherein said valve is continuously variable between a closed state and an open state; and said flow of crankcase emissions is regulated by said valve in response to a pressure detected at said crankcase.

15. An apparatus according to claim 14, wherein said flow of crankcase emissions is regulated by said valve in response to the difference between said detected pressure and a predetermined pressure value.

* * * * *

UNITED STATES PATENT AND TRADEMARK OFFICE
CERTIFICATE OF CORRECTION

PATENT NO.   : 5,722,376
DATED        : 3 March 1998
INVENTOR(S)  : Theodore P. Sweeten It is certified that error appears in the above-indentified patent and that said Letters Patent is hereby corrected as shown below:

In Column 5, Line 45: please delete "claim 4" and insert --claim 1-- therefor.

Signed and Sealed this

Sixth Day of April, 1999

Attest:

Q. TODD DICKINSON

Attesting Officer

Acting Commissioner of Patents and Trademarks